O. SARTORIUS, J. F. GÁNDARA AND B. COLONNA.
FILM FOR CAMERAS.
APPLICATION FILED JAN. 22, 1916.
1,312,052. Patented Aug. 5, 1919.
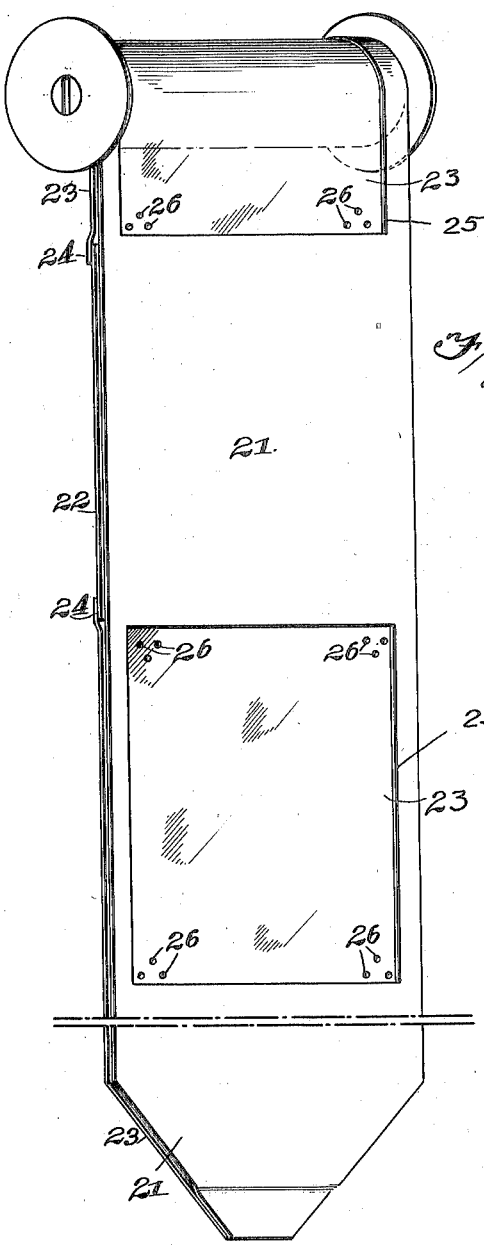
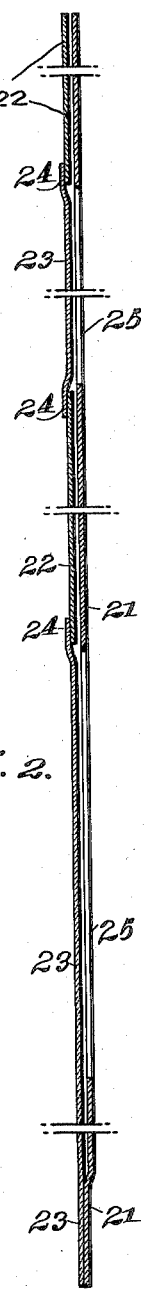

UNITED STATES PATENT OFFICE.

OTON SARTORIUS, JOSÉ F. GÁNDARA, AND BENITO COLONNA, OF EL PASO, TEXAS.

FILM FOR CAMERAS.

1,312,052.      Specification of Letters Patent.      Patented Aug. 5, 1919.

Application filed January 22, 1916. Serial No. 73,619.

*To all whom it may concern:*

Be it known that we, OTON SARTORIUS, JOSÉ F. GÁNDARA, and BENITO COLONNA, citizens of the Republic of Mexico, and residents of El Paso, in the county of El Paso and State of Texas, have invented an Improvement in Films for Cameras, of which the following is a specification.

This invention is an improvement in photography and has particular reference to a novel construction of film used therein.

The object is the provision of a film of novel construction consisting of sensitized and nonsensitized portions arranged in alternating relation throughout the length of the film to permit of focusing an image between successive exposures whereby a visual image for each sensitized portion, successively exposed, may be observed before introducing the same into the focal plane, the nonsensitized portion employed being of novel formation.

The inventive idea involved is capable of receiving a variety of mechanical expressions, one of which, for the purpose of illustrating the invention, is shown in the accompanying drawings, in which—

Figure 1 is a perspective view of the film embodying our invention.

Fig. 2 is a longitudinal section of the film.

The film, which comprises the invention, preferably consists of a protective backing or covering strip 21 and alternating sensitized and nonsensitized portions 22 and 23 respectively, the adjacent ends of said portions 22 and 23 being overlapped and secured together in any preferred manner as shown at 24 in Fig. 2. The portions 22 and 23 form a continuous strip one end of which is secured to the protective covering or backing 21. This covering is provided with spaced rectangular openings 25 corresponding in number to the number of nonsensitized portions 23 and being of a size substantially equal to the size of the exposure to be made. The covering strip may be provided with the usual suitable indicia visible through the usual rear opening of a camera for the purpose of determining when the nonsensitized portions of the film are in position for focusing an image and when the sensitized portions are in position for exposure. The nonsensitized portions 23 of the film are preferably made of translucent material, such as tissue paper so that when focusing an image, through a sight opening in the camera casing, said image will be visible upon the portion 23 and the camera may be then adjusted to the proper position for making a perfect exposure. It is to be understood that the film is mounted on the usual feed and take-up rollers so that alternating nonsensitized and sensitized portions may be brought into proper position. After an image has been properly focused the hood of the camera is closed and the film then wound upon the take-up roller until the next succeeding sensitized portion 22 is in proper position as indicated by the indicia visible through the usual opening in the camera used whereupon the exposure may be made as usual.

Each of the nonsensitized portions 23 of the film is provided with a plurality of small openings 26 preferably arranged in groups at each corner of the portion and adapted to prevent the rupture of the same when opening or closing the bellows of the front of the camera.

What is claimed is:

1. A camera film comprising a protective backing having spaced sight openings, alternately arranged independent sensitized and non-sensitized sections arranged end to end and secured together to form a continuous strip, said strip secured at one end to said protective backing, said non-sensitized sections disposed to register with the aforesaid sight openings in the backing and the non-sensitized sections provided with a plurality of rupture preventing openings, for the purpose set forth.

2. A camera film comprising a protective backing having a series of spaced sight openings, therethrough, alternating independent sensitized and non-sensitized sections having their adjacent edges overlapped and secured together and to the protective backing at one end, said non-sensitized sections disposed to register with the aforesaid sight openings and provided with rupture preventing openings for the purpose specified.

3. A camera film comprising a protective backing having a series of spaced sight openings and a series of alternately arranged sensitized and non-sensitized sections superposed on said backing, the non-sensitized sections disposed to register with the aforesaid sight openings and provided with relatively small openings to prevent rupture by air currents caused by the opening and closing of the bellows of a camera in which the film may be mounted.

4. A camera film comprising a protective backing having spaced openings and alternating sensitized and non-sensitized portions having their adjacent edges secured together to form a continuous strip one end of which is secured to said backing, said non-sensitized portion being provided with a plurality of openings, substantially for the purpose set forth.

OTON SARTORIUS.
JOSÉ F. GÁNDARA.
BENITO COLONNA.

Witnesses:
C. W. O. NEWMAN,
F. E. STEVENSON.